United States Patent [19]
Hopkins et al.

[11] Patent Number: 5,980,754
[45] Date of Patent: *Nov. 9, 1999

[54] PROCESS FOR RECOVERING COMPONENTS OF A FLOAT MATERIAL FROM WASTE WATER TREATMENT SYSTEM

[75] Inventors: Matthew B. Hopkins, Kennesaw; Robert J. DeRosa, Marietta, both of Ga.

[73] Assignee: Novus International, Inc., St. Louis, Mo.

[*] Notice: This patent is subject to a terminal disclaimer.

[21] Appl. No.: 08/787,792

[22] Filed: Jan. 23, 1997

Related U.S. Application Data

[63] Continuation-in-part of application No. 08/599,479, Jan. 23, 1996, Pat. No. 5,658,462.

[51] Int. Cl.$^6$ ................................ C02F 1/24; C02F 1/26; C02F 1/38; C02F 9/00
[52] U.S. Cl. ........................ 210/703; 210/634; 210/774; 210/768; 210/780; 210/785; 210/804; 210/805; 210/806; 426/657; 554/8; 554/20; 554/23; 554/175; 554/177
[58] Field of Search .................................. 210/703, 768, 210/804, 805, 806, 774, 634, 780, 785; 426/657; 554/8, 20, 23, 175, 177

[56] References Cited

U.S. PATENT DOCUMENTS

| | | |
|---|---|---|
| 3,352,842 | 11/1967 | Lyon . |
| 3,519,662 | 7/1970 | Gruver . |
| 3,899,419 | 8/1975 | Emanuel . |
| 3,940,334 | 2/1976 | Miyazawa . |
| 4,163,009 | 7/1979 | Filstrup . |
| 4,756,092 | 7/1988 | Anderson et al. . |
| 4,961,858 | 10/1990 | Spei et al. ............................... 210/708 |
| 4,966,733 | 10/1990 | Fernando et al. . |
| 4,981,599 | 1/1991 | Stewart, Jr. . |
| 5,030,359 | 7/1991 | Castrantas et al. ..................... 210/705 |
| 5,053,140 | 10/1991 | Hurst . |
| 5,173,190 | 12/1992 | Picek . |

(List continued on next page.)

FOREIGN PATENT DOCUMENTS

| | | |
|---|---|---|
| 3212120 A1 | 10/1983 | Germany . |
| 4228096 A1 | 3/1994 | Germany . |
| 1098716 | 1/1968 | United Kingdom . |

OTHER PUBLICATIONS

Process flow sheet, "WSI Protein Fat Separator," supplemental to the May 15, 1997 Declaration.
European Patent Publication No. 0013659—with English Abstract, Water purification by oil or wax extraction to remove halogen- or nitro-group containing hydrocarbon and/or aromatic hydroxy derivatives, Jul. 23, 1980.
German Patent Publication No. 2901261—with English Abstract, Removing halogenated or nitrated organic compounds from water by extraction with fatty oil or wax, Jul. 24, 1980.
Report by Paul L. Lau, Contra Costa Water District, Concord, California, Drying of Alum Sludge Using the Carver–Greenfield Process, Publication Date Unknown.
Paper presented at 1992 National Meeting of the American Chemical Society; Authors—T. Holcombe & J. Sukkel, Conversion of Biosolids to Fertilizer with the Carver–Greenfield Process, Aug. 1992.

(List continued on next page.)

*Primary Examiner*—Thomas M. Lithgow
*Attorney, Agent, or Firm*—Senniger, Powers, Leavitt & Roedel

[57] ABSTRACT

A process for recovering protein, fatty and water components from a float material produced by a waste water treatment system, wherein the protein and fatty components can be further processed for inclusion in various products, such as animal feed. The recovered water component can also be further processed before discharged into a sewer system.

29 Claims, 2 Drawing Sheets

U.S. PATENT DOCUMENTS

| | | |
|---|---|---|
| 5,174,903 | 12/1992 | Miller . |
| 5,186,817 | 2/1993 | Paspek et al. . |
| 5,286,386 | 2/1994 | Darian et al. . |
| 5,372,724 | 12/1994 | Ahmed . |
| 5,413,720 | 5/1995 | Miller . |
| 5,458,780 | 10/1995 | Evans . |
| 5,458,789 | 10/1995 | Dickerson et al. . |
| 5,543,058 | 8/1996 | Miller . |
| 5,658,462 | 8/1997 | Hopkins . |

OTHER PUBLICATIONS

Report from the U.S. Environmental Protection Agency; EPA Document No. EPA/540/AR–92/002, The Carver–Greenfield Process; Dehydro–Tech Corporation; Applications Analysis Report, Aug. 1992.

Product Information Sheet from WaCon Incorporated of Atlanta, Georgia, Polyhance®AE 1706, Publication Date Unknown, but believed to be prior to May 10, 1989.

Article from Fertilizer International No. 327; pp. 15–17, The Smell of Success in Manure, Nov. 1993.

PROCESS FOR RECOVERING COMPONENTS OF A FLOAT MATERIAL FROM WASTE WATER TREATMENT SYSTEM

RELATED APPLICATIONS

This is a continuation-in-part of application Ser. No. 08/599,479, filed Jan. 23, 1996 (now U.S. Pat. No. 5,658,462).

TECHNICAL FIELD

This invention relates to the components of a float material which is produced from a waste water treatment system. In a more specific aspect, this invention relates to a process for recovering (i.e., separating) certain of these components to provide an industrial plant with increased efficiency and profitability with regard to the by-products generated by the plant.

BACKGROUND OF THE INVENTION

Most cities and counties have enacted requirements for industries which discharge water into the municipal sewer systems. These municipalities generally require the waste water to meet certain standards before being discharged into the sewer systems, and these standards usually relate to the level of pollutants which interfere with the efficient operation of the municipal waste water treatment facility.

Waste water which contains materials having a high biochemical oxygen demand, total suspended solids and ammonia increase the treatment cost to the city or county. The term "biochemical oxygen demand" ("BOD") refers to the quantity of oxygen utilized in the biochemical oxidation of organic matter; and the term "total suspended solids" ("TSS") refers to the total suspended solids which float on the surface of, or are suspended in, waste water and which are removable by filtering.

In some instances, a surcharge may be levied on an industrial plant that produces waste water which does not meet the standards as established by the municipality. For example, these standards may prohibit waste water containing greater than 300 mg/liter of BOD, 300 mg/liter of TSS, and/or 18 mg/liter of ammonia. Cities and counties may also prohibit industrial plants from discharging waste water having an oil, grease and fat ("FOG") concentration greater than 150 mg/liter.

A city or county also has the authority to revoke an industrial plant's waste water discharge permit if that plant continues to discharge waste water which does not meet the standards set by that city or county. Therefore, an industrial plant must effectively treat its waste water to reduce the level of pollutants and thereby meet such standards.

An effective waste water treatment process for an industrial plant should cause the solid organic and inorganic matter to flocculate and form a sludge cake. This sludge cake accumulates to a certain thickness and is then separated from the liquid component of the waste water and sent to a rendering plant for further processing. If the resulting sludge cake is under 18% solids, the rendering plant may impose a surcharge because sludge with a high percentage of water is more expensive for the rendering plant to process.

One method of treating waste water from an industrial plant is disclosed in Stewart U.S. Pat. No. 4,981,599. This process results in the formation of a sludge cake on top of the waste water. The sludge cake is removed, and the treated waste water is discharged into the sewer system.

However, the sludge cake (also referred to as a float material) produced by the Stewart process is not ideally suited for subsequent treatment at a rendering plant because (1) the water content of the float material is higher than desired and (2) the float material is comprised of fatty and protein components which desirably should be separated from the water component.

Therefore, a need exists for a process which can be used to separate the protein, fatty and water components of a float material produced by a waste water treatment system. Additionally, this process should provide protein and fatty components with a high percentage of solids (i.e. a low percentage of water content).

SUMMARY OF THE INVENTION

Briefly described, the present invention provides a process for separating a float material, which is produced by a waste water treatment system at an industrial plant, into certain components which can then be further processed as necessary to enhance their subsequent utility. More specifically, these components may be defined as protein, fatty and water components.

This invention also provides a process by which the water content of the separated protein and fatty components has been decreased.

Generally, the present invention is directed to a process for treatment of a float material comprising a protein component, a fatty component and a water component, the process comprising heating a carrier material to a temperature below about 99° C., forming a treatment mixture by mixing the carrier material and a float material at a ratio of float material to carrier material which is between about 1:1 and about 1:20, and separating the treatment mixture into a protein component, a fatty component phase and a water component phase. The separated or recovered components can be further processed as desired to meet specific uses. Alternatively, the fatty component or water component may be recycled into this process to provide increased efficiency.

The present invention is further directed to a process for treatment of a float material comprising a protein component, a fatty component and a water component, the process comprising forming a hot treatment mixture of the float material and the carrier material, the temperature of the mixture being between about 77° C. and 99° C., and separating a fatty component phase and a water component phase from the mixture.

The present invention is further directed to a process for treatment of a float material comprising a protein component, a fatty component and a water component, the process comprising contacting the float material with a hot carrier material, the carrier material comprising an organic oil having a decomposition temperature not lower than about 110° C. and a vapor pressure which is preferably no greater than about 25 mm Hg at 100° C., and separating a fatty component comprising the carrier material from the float material.

The present invention is still further directed to a process for the treatment of a float material comprising a protein component, a fatty component and a water component, the process comprising forming a treatment mixture by contacting a float material with a carrier material, the carrier material comprising an organic oil having a vapor pressure which differs from a vapor pressure of the fatty component by no more than about 10 mm Hg at 100° C.; and separating a fatty component phase and a water component phase from the treatment mixture.

The present invention is still further directed to a process for the recovery of a fatty component from waste water comprising a fatty component and a water component, the process comprising aerating the waste water in a floatation zone in the presence of a flocculent to produce a float material at the upper surface of the waste water, the float material comprising the fatty component and water; separating the float material from the underlying water phase; contacting the float material with a hot carrier material to produce a treatment mixture, the carrier material having been heated to a temperature between about 77° C. and 99° C. prior to contacting with the float material; and separating a fatty component phase and a water component phase from the treatment mixture.

It is to be noted that the above sequence of steps is important because the fat must be liquefied before any effort is made to separate the protein component. This is a critical feature of the invention. After liquefication is achieved, it is also preferred that the protein component be removed before separation of the fatty component phase and the water component phase, though the reverse sequence is also feasible. Alternative embodiments of the process may also be used to achieve similar results, as herein described below.

The process of this invention allows for optional steps to aid in the processing of a particular float material. For example, a float material which is difficult to separate into its protein, fatty and water components could be processed twice through the mixing step prior to separation of the protein component. Additionally, certain chemicals, such as dispersants, can be used as necessary.

The present invention provides protein, fatty and water components which have been recovered from a float material and which can be used in subsequent operations (e.g., rendering) well known in the industry.

Accordingly, an object of this invention is to provide a process for the treatment of a float material produced by a waste water treatment system or other industrial process.

Another object of this invention is to provide a process for the treatment of a float material produced by a waste water treatment system utilized by an industrial plant.

Another object of this invention is to provide a process by which a float material can be separated into protein, fatty and water components.

Another object of this invention is to process float material to recover a protein component which has a high solids content.

Another object of this invention is to process a float material to recover a fatty component which has a low water content.

Still another object of this invention is to process a float material to recover a water component which can be discharged into a sewer system.

Still another object of this invention is to provide a process for the treatment of a float material, wherein the process does not employ flash evaporation or other process steps designed to evaporate water.

These and other objects, features and advantages of this invention will become apparent from the following detailed description.

DETAILED DESCRIPTION OF THE INVENTION

Figure 1:
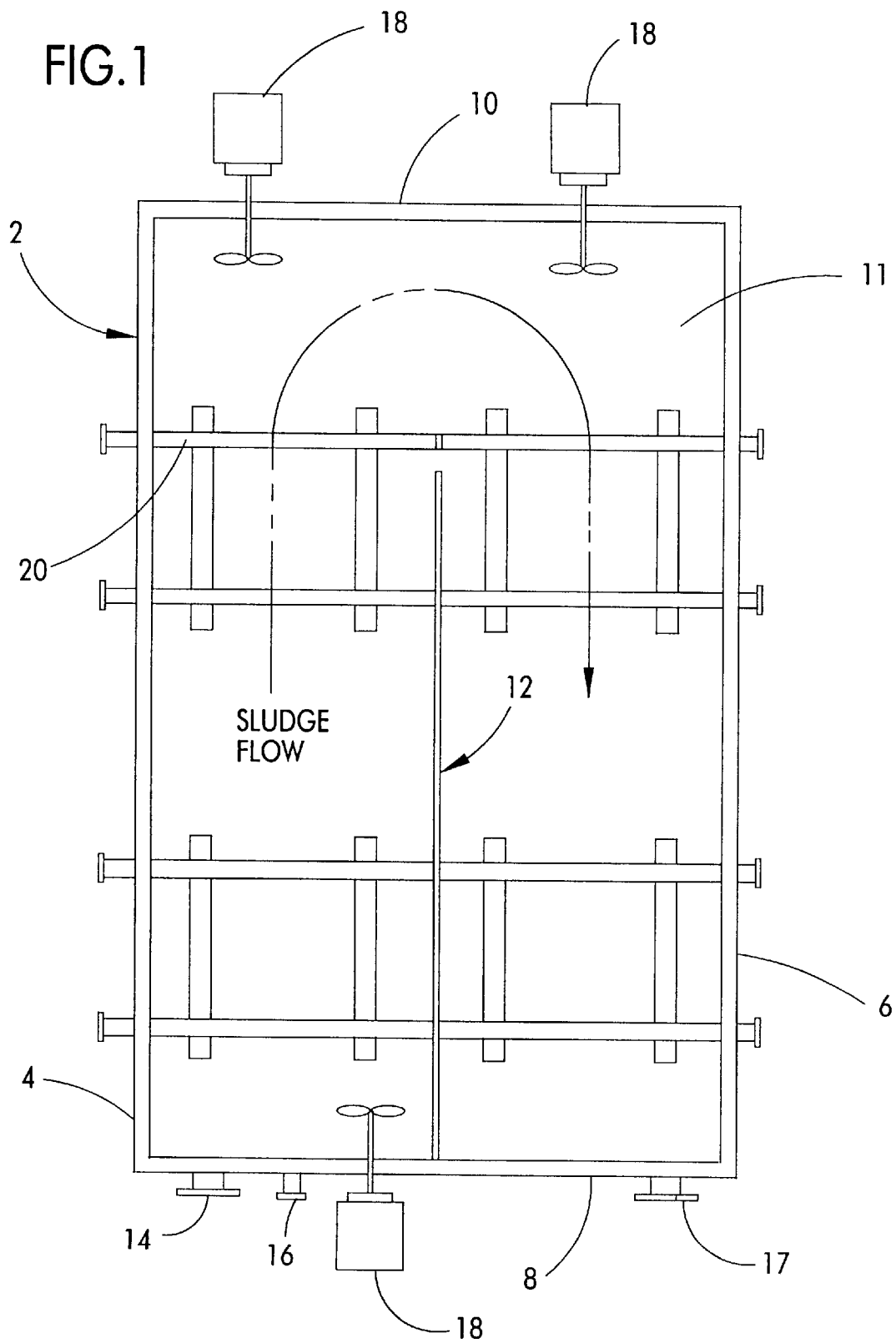
FIG. 1 is a top plan view of a tank in which a treatment mixture is formed.

For the purposes of this invention, the following definitions are important:

(1) float material—a material obtained from an industrial plant comprising fats, oils and greases ("FOG"); preferably, a material comprising the sludge cake or solid materials which are produced by the waste water treatment system of an industrial plant; most preferably, a material which has been separated from an underlying water phase after first subjecting waste water to an aeration process in a floatation zone in the presence of a flocculent;

(2) protein component—the proteinaceous material recovered from the float material, which typically comprises animal protein but which may also include other types of protein depending upon the nature of the industry from which the float material is obtained;

(3) fatty component—the liquid component which is recovered from the float material and which principally comprises fats, oils and greases;

(4) water component—water recovered from the float material; and (5) carrier material—a liquid which affords the means by which to achieve one or more of the following results: (a) provide heat to a float material, and (b) ensure that the fats, oils and greases which become liquefied as a result of heating remain in a liquid state.

The carrier material may be water, or more preferably, a water-immiscible liquid compatible (i.e., fully miscible) with the fatty component of the float material, e.g., the carrier may advantageously comprise an oleaginous material, preferably comprising a natural oil. Particularly preferred carrier materials include natural oils such as animal fat, vegetable oil and fish oil. If the carrier material comprises a natural oil such as animal fat, the animal fat content is typically greater than about 85 weight percent, preferably greater than about 90 weight percent, most preferably greater than about 95 weight percent. Similar proportions preferably prevail where the carrier predominantly comprises a vegetable oil.

If a water-immiscible carrier is used, the density of the carrier is lower than one, preferably lower than about 0.95 g/cc. Where the carrier is an organic oil, its density is preferably between about 0.85 and about 0.95 g/cc. It is particularly preferred that an organic oil carrier comprise a heat stable material having a low vapor pressure so as to minimize both degradation of the carrier and generation of fumes in heating the carrier and mixing it with the float material. Advantageously, the decomposition temperature of the carrier is at least about 110° C. (230° F.). The vapor pressure of the carrier is typically not greater than about 25 mm Hg at 100° C. (212° F.) and, preferably, is not greater than about 15 mm Hg at 100° C. In addition, the vapor pressure of the organic oil carrier generally differs from a vapor pressure of the fatty component by not more than about 50 mm Hg at 100° C. Preferably, these vapor pressures will differ by no more than about 25 mm Hg at 100° C. and, more preferably, by no more than about 10 mm Hg at 100° C. Most preferably, the vapor pressure of the carrier and the fatty component will be substantially the same.

To facilitate mixing of the carrier with the float material and separation of the fatty component from the resulting mixture, it is preferred that an organic oil carrier have a dynamic viscosity no greater than about 100 cps at 60° C. (140° F.). It is further preferred that the surface tension of an organic oil carrier be between about 15 and about 60 dynes/cm at 25° C. (77° F.), and a solubility in water of no greater than about 10 percent. It is further preferred that the solubility of water in such organic oil carrier being no greater than about 3 percent.

The carrier material is heated to a temperature below the boiling point of water in order to minimize the evaporation of water and other volatile substances contained in the treatment mixture. Typically, the carrier is heated to a temperature below about 99° C. (210° F.). Preferably, the carrier is heated to a temperature within the range of about 66° C. (150° F.) to about 96° C. (205° F.). Most preferably, the carrier is heated to a temperature within the range of about 77° C. (170° F.) to about 93° C. (200° F.)

Heating is necessary in order to ensure the carrier material is in a liquid or flowable form, which will enhance its use in the present invention. Heating the carrier material also affords a means by which to liquefy fat and grease contained within the float material, which tend to exist in a solid and/or semi-solid form in the sludge collected from a waste water treatment system. Experience has shown that direct heating of the sludge will cause the fat and grease to liquefy but, in the absence of a carrier material, the liquefied fat and grease may eventually return to a solid and/or semi-solid form. Without being held to any particular theory, it is believed that this return to a solid and/or semi-solid form may occur because of the addition of flocculents or other processing chemicals, such as alum or ferric chloride, during the waste water treatment process. These chemicals may cause the fats to polymerize or otherwise congeal after liquefication. The carrier material, therefore, acts as a diluent to ensure that the fats and greases remain in a liquefied form.

A treatment mixture is formed by mixing the heated carrier material with the float material. Typically, the treatment mixture will contain a quantity of carrier material which is about equal to or greater than that of the float material. Preferably, the mixture will have a ratio of float material to carrier material between about 1:1 and about 1:20 and, most preferably, between about 1:3 and 1:10.

Heating of the carrier material, as well as formation of the treatment mixture, may be carried out using methods and apparatus which are well known in the art. However, referring now to FIG. 1, a preferred embodiment will herein be described. A vertical tank, indicated generally at 2, of horizontal cross-section includes side walls 4 and 6, end walls 8 and 10, and a bottom wall 11. A vertical baffle 12 extends from bottom wall 11 and end wall 8 substantially parallel to and equidistant from side walls 4 and 6. The end of baffle 12 opposite end wall 8 is spaced from end wall 10 to define a flow path therebetween. Float material may be introduced into the tank through an inlet 14 in end wall 8 between baffle 12 and side wall 4, and carrier material may be introduced through another inlet 16 in the same region of the interior of tank 2. The mixture of carrier and float material may be removed from tank 2 via an exit port 17 in end wall 8 between baffle 12 and side wall 6. Thus, the walls of tank 2 and baffle 12 define a longitudinal horizontal flow path of relatively high length to lateral dimension for passage of the treatment mixture through the tank.

Tank 2 is further provided with at least one agitator which extends vertically into the tank, thus causing the float material and carrier material to be intimately mixed in a dispersion zone within the tank. As illustrated, tank 2 includes three agitators 18 longitudinally spaced along the flow path of treatment mixture through tank 2, so that substantially the entire working volume of the tank constitutes a dispersion zone for intimate contact and thorough mixing of carrier and float material. Heating coils 20 are positioned within tank 2 to provide heat to the treatment mixture in order to ensure the mixture remains in liquefied form.

It is to be understood that the means by which heating and mixing are accomplished may be other than that which is herein described and still fall within the scope of the present invention.

A treatment mixture is formed as the carrier material and float material enter tank 2 and become mixed by agitators 18. The rate of agitation is sufficient to avoid settling of the solids which are present in the float material, and yet it is not so vigorous that shearing of these solids occurs. This agitation also acts to maximize the surface area of the float and carrier materials, in order to allow for intimate contact between them. Such contact providing a means by which to efficiently transfer heat from the carrier material to the float material, and to cause the carrier material to coalesce and form a single phase with the components of the float material with which the carrier material is miscible. Mixing at this stage is therefore sufficient to create a substantially homogeneous mixture, which is to be understood herein as the thorough dispersion of the float material in the carrier material, or the carrier material in the float material, and which is sufficient to promote the coalescence of the carrier material with the components of the float material with which it is miscible.

The treatment mixture proceeds through the tank substantially in a thoroughly dispersed state until it exits the tank through port 17. Residence time of the treatment mixture in the dispersion zone typically ranges from at least about 30 seconds to about 1 hour, depending upon the characteristics of the carrier and float materials. Preferably, the residence time ranges from about 10 minutes to about 40 minutes. Most preferably, the residence time will range for about 15 minutes to about 30 minutes.

A protein component may be separated from the treatment mixture by any means known to the art for removing solids from solution. For example, a centrifuge or a pre-coated filter could be used to separate the protein. Preferably, however, a shaker screen is used which comprises one or more screens (i.e., filters) which progressively screen out and discharge the protein component. The treatment mixture is passed through the shaker screen to remove the protein component. A liquid mixture is collected and discharged through an opening located in the lower portion of the equipment.

The protein component which is recovered typically has a solids content of at least about 25 percent by weight. Preferably, the solids content ranges from about 30 percent to about 40 percent by weight. Most preferably, the solids content exceeds at least about 50 percent by weight. Once collected, these solids may be transported to a rendering plant for further processing.

The liquid mixture comprises a water-immiscible phase comprising the fatty component (i.e., fatty component phase) and an aqueous phase which contains the water component (i.e., water component phase). The carrier is contained in the phase with which the carrier is compatible. These phases are separated using various types of dewatering equipment known to the art, including a centrifuge. Preferably, however, these phases are separated by gravity using a conventional two compartment clarifier.

Figure 2:
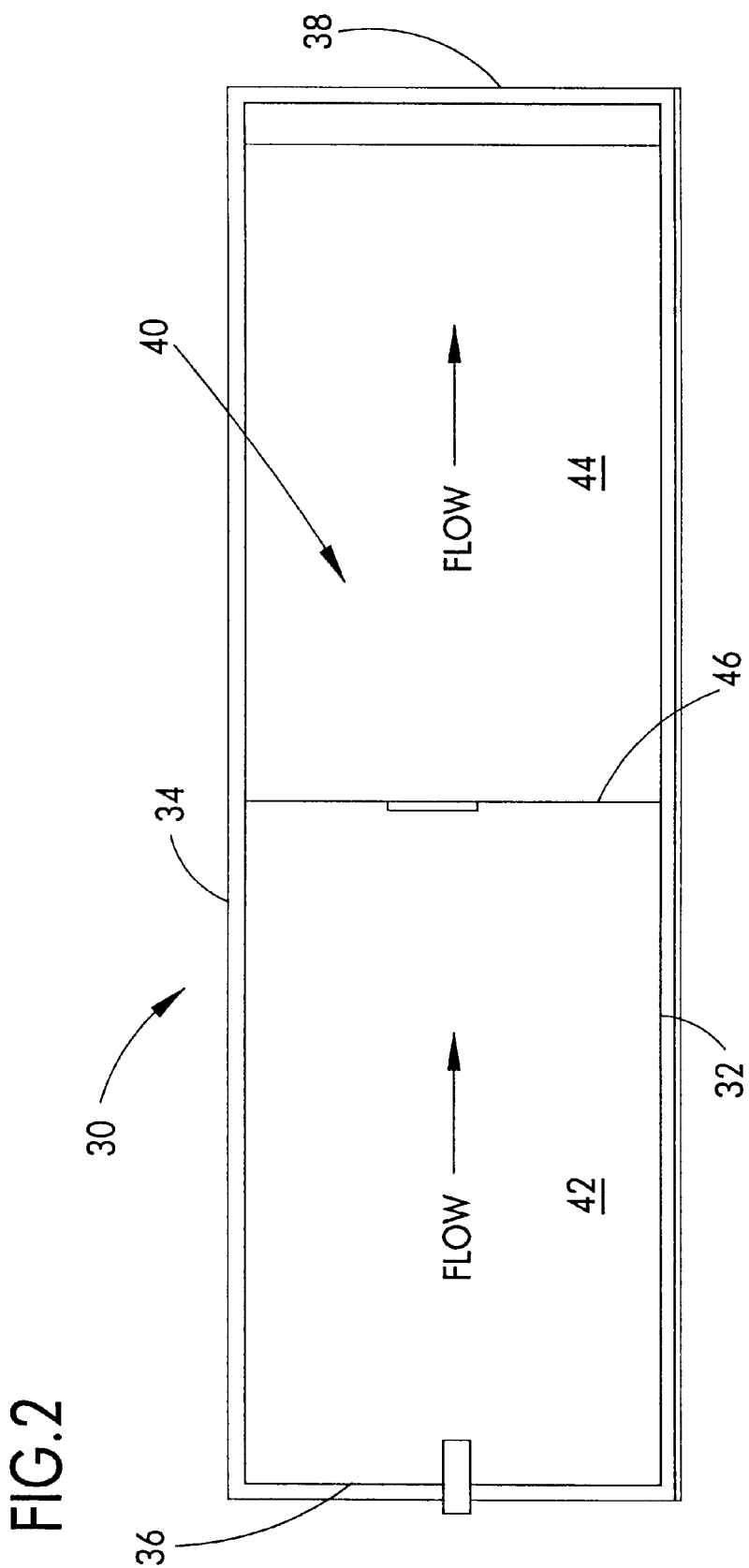
FIG. 2 is a top plan view of a clarification tank in which a liquid mixture is separated into a fatty component phase and a water component phase.

Referring now to FIG. 2, the liquid mixture is separated in a clarifier comprising a vertical tank, indicated generally at 30, of horizontal cross-section which includes side walls 32 and 34, end walls 36 and 38, and a bottom wall 40.

Preferably, a two compartment clarifier is used, the first compartment 42 and second compartment 44 being separated by a vertical baffle or weir 46, which extends from bottom wall 40 and between side walls 32 and 34. The mixture is introduced into the first compartment 42 of the clarifier and allowed to gravity separate, resulting in the lighter fatty component phase rising to the top.

In batch operation or during start-up of a continuous process, the fatty component accumulates above the aqueous phase until it eventually overflows the top of the weir 46 into the second compartment 44. In a continuous operation, charge of liquid mixture to the first compartment 42 and flow of fatty component over the weir 46 thereafter continues in steady state. The water component is withdrawn from the lower part of the first compartment through a port (not shown). Further dewatering of the fatty component may take place in the second compartment of the clarifier.

Although some impurities may be present, the fatty component which is collected has a water content which is typically less than about 4 percent by weight and, preferably, less than about 2 percent by weight. The fatty component phase is suitable for being transported to a rendering plant for further processing for use in various applications, such as animal feeds. Alternatively, the fatty component phase may be divided into a plurality of fractions, including a fatty component fraction and a fatty recycle fraction, the carrier material thus comprises the fatty recycle fraction.

The water component phase which remains in the first compartment is discharged and recycled back to an industrial waste water treatment system, where it may be further processed into the sewer system if all discharge requirements have been met. However, if the carrier material is comprised of water, the water component phase may be divided into a water component effluent fraction and an aqueous recycle fraction, the carrier material thus comprises the aqueous recycle fraction.

In an alternative embodiment of the process of the present invention, the float material could be separated into its respective protein, fatty and water components by first subjecting the treatment mixture to a dewatering process. A two compartment clarify, as discussed above, may be used to gravity separate the treatment mixture. Preferably, however, a clarifier comprising a single, round compartment with a conical shaped bottom is employed. The treatment mixture is added to this tank and the fatty component phase and the water component phase are allowed to separate. A side port near the top of the tank is used to remove the fatty component phase. The water component phase, along with the protein component which settles near the bottom of the tank, are removed through a centrally located port at the bottom of the cone. The protein component may then be collected by passing the liquid component phase through a shaker screen, or by using some other means for removing solids as discussed above.

It is to be noted that the process of the present invention affords a means by which to obtain a protein component and a fatty component from a float material in a form which is sufficiently free of water such that it may be sent directly to a renderer without additional treatment. The present process is more energy efficient than processes employing conventional evaporation techniques, for example, because energy is not spent on the evaporation of water or organic solvents.

It is also to be noted that the process of the present invention can be effectively used in either a batch or continuous system. For reasons of process economy, a continuous system is preferred.

During the practice of this invention, various systems and controls can be employed to monitor and control the process steps and the flow rate of the various substances. These systems and controls can be based on computer calculations and/or manual adjustments.

The process of the present invention is further illustrated by the following Example. This Example is designed to teach those of ordinary skill in the art how to practice this invention and is meant to represent the best mode contemplated for carrying out a preferred embodiment of this invention. It is not, however, to be interpreted in a limit sense.

EXAMPLE

A quantity of animal fat (i.e., the carrier material) is heated using steam in a jacketed vessel until the temperature of the liquefied animal fat is within the range of 77–88° C. (170–190° F.). The liquefied animal fat is then pumped into a mixer equipped with a stirring mechanism. Simultaneously, the float material produced by a waste water treatment system at a food processing plant is introduced into the mixer.

The heated carrier material and float material are mixed for approximately 30 minutes until a treatment mixture is obtained. The mixture is then pumped into a shaker screen apparatus having 3 concentric screen sections of 80 (top), 120 (middle), and 150 (bottom) mesh sizes. The screens permit the water and fatty components of the mixture to pass through. These components are then discharged through an opening located at the bottom of the apparatus.

The screen sizes are selected so that the protein component will not pass through in any substantial amount but, instead, will be screened and discharged from the apparatus through openings located immediately after each screen but before the next screen or bottom opening. The protein component, which is collected from the apparatus and then transported to a rendering plant, has a solids content of about 30 to 40 percent by weight.

The liquid mixture which remains after being discharged from the bottom of the shaker screen apparatus is primarily comprised of a fatty component phase and a water component phase. This mixture is pumped to a clarifier apparatus, which is rectangular and has 2 compartments separated by a baffle. This mixture is pumped into a first compartment after which the water component phase, being heavier than the fatty component phase, begins to sink toward the bottom. As additional liquid mixture from the shaker screen apparatus is introduced into the first compartment, the level rises toward the top of the baffle. When the level reaches the top of the baffle, the lighter fatty component phase spills over into the second compartment. The fatty component phase, which has a moisture content of less than about 2 percent by weight, is discharged from the second compartment and can be recycled into this process or transported to a rendering process.

To maintain the proper level in the first compartment, the water component phase is discharged from the bottom of the first compartment. This component phase can be further treated, as necessary, before discharging into a municipal sewer or using in other applications.

The process of the present invention has been described in detail with particular reference to preferred embodiments. However, variations and modifications can be made without departing from the spirit and scope of the invention as defined by the claims which follow. Such variations or modifications may include, among other things, the formation of a treatment mixture by either (i) heating the float material and mixing it with a carrier material, or (ii) mixing the float material and the carrier material and then applying heat.

What is claimed is:

1. A process for the treatment of a float material comprising a protein component, a fatty component and a water component, the process comprising:

heating a carrier material to a temperature below about 99° C.;

forming a treatment mixture by mixing the carrier material and a float material, the mixture having a ratio of float material to carrier material between about 1:1 and about 1:20;

separating a protein component from the treatment mixture, thereby producing a liquid mixture comprising a fatty component phase and an aqueous component phase; and, gravity separating the aqueous component phase from the fatty component phase.

2. The process as set forth in claim 1 wherein the carrier material comprises a natural oil.

3. The process as set forth in claim 2 wherein the natural oil comprises a vegetable oil.

4. The process as set forth in claim 2 wherein the natural oil comprises an animal fat.

5. The process as set forth in claim 4 wherein the natural oil contains at least about 90 weight percent animal fat.

6. The process as set forth in claim 4 wherein the natural oil contains at least about 95 weight percent animal fat.

7. The process as set forth in claim 2 wherein the natural oil comprises a fish oil.

8. The process as set forth in claim 1 wherein the carrier material comprises water.

9. The process as set forth in claim 1 wherein said float material is prepared by a process comprising:

aerating waste water in a flotation zone in the presence of a flocculent to produce said float material at the upper surface of the waste water; and, separating said float material from the underlying water phase.

10. The process as set forth in claim 1 wherein the fatty component phase contains the carrier material.

11. The process as set forth in claim 10 wherein the fatty component phase is divided into a plurality of fractions including a fatty component product fraction and a fatty recycle fraction, said carrier material comprising said fatty recycle fraction.

12. The process as set forth in claim 8 wherein the aqueous component phase is divided into a water component effluent fraction and an aqueous recycle fraction, said carrier material comprising said aqueous recycle fraction.

13. The process as set forth in claim 1 wherein the carrier material is heated to a temperature within the range of about 77° C. to about 93° C.

14. The process as set forth in claim 1 wherein the ratio of float material to carrier material is between about 1:3 to about 1:10.

15. The process as set forth in claim 1 wherein the fatty component phase, after being separated from the aqueous component phase, has a moisture content of less than about 2 percent by weight.

16. The process as set forth in claim 1 wherein the protein component, after being separated from the treatment mixture, has a solids content of at least about 25 percent by weight.

17. The process as set forth in claim 1 wherein forming of the treatment mixture is achieved by mixing the carrier material with the float material for about 15 minutes to about 30 minutes.

18. The process as set forth in claim 1 wherein the protein component comprises animal protein.

19. The process as set forth in claim 1 wherein the fatty component comprises fats, oils and greases.

20. The process as set forth in claim 1 wherein said protein component is separated from said treatment mixture by passing said treatment mixture through a shaker screen.

21. A process for the treatment of a float material comprising a protein component, a fatty component and a water component, the process comprising:

heating a carrier material to a temperature below about 99° C.;

forming a treatment mixture by mixing the carrier material and a float material, the mixture having a ratio of float material to carrier material between about 1:1 and about 1:20;

gravity separating a fatty component phase from the treatment mixture, thereby producing a solid/liquid mixture comprising a protein component and an aqueous component phase; and, separating the protein component and the aqueous component phase.

22. The process as set forth in claim 21 wherein said carrier material comprises water.

23. The process as set forth in claim 22 wherein said aqueous component phase is divided into an aqueous effluent fraction and an aqueous recycle fraction, said carrier material comprising the aqueous recycle fraction.

24. The process as set forth in claim 21 wherein the carrier material is heated to a temperature within the range of about 77° C. to about 93° C.

25. The process as set forth in claim 21 wherein the ratio of float material to carrier material is between about 1:3 to about 1:10.

26. The process as set forth in claim 21 wherein said fatty component phase has a moisture content of less than about 2 percent by weight.

27. The process as set forth in claim 21 wherein said protein component has a solids content of at least about 25 percent by weight.

28. The process as set forth in claim 27 wherein said protein component comprises animal protein.

29. The process as set forth in claim 21 wherein forming of the treatment mixture is achieved by mixing the carrier material with the float material for about 15 minutes to about 30 minutes.

* * * * *